June 21, 1960 W. E. HUBER ET AL 2,941,413
POWER TRANSMISSION BELTS
Filed Jan. 22, 1957
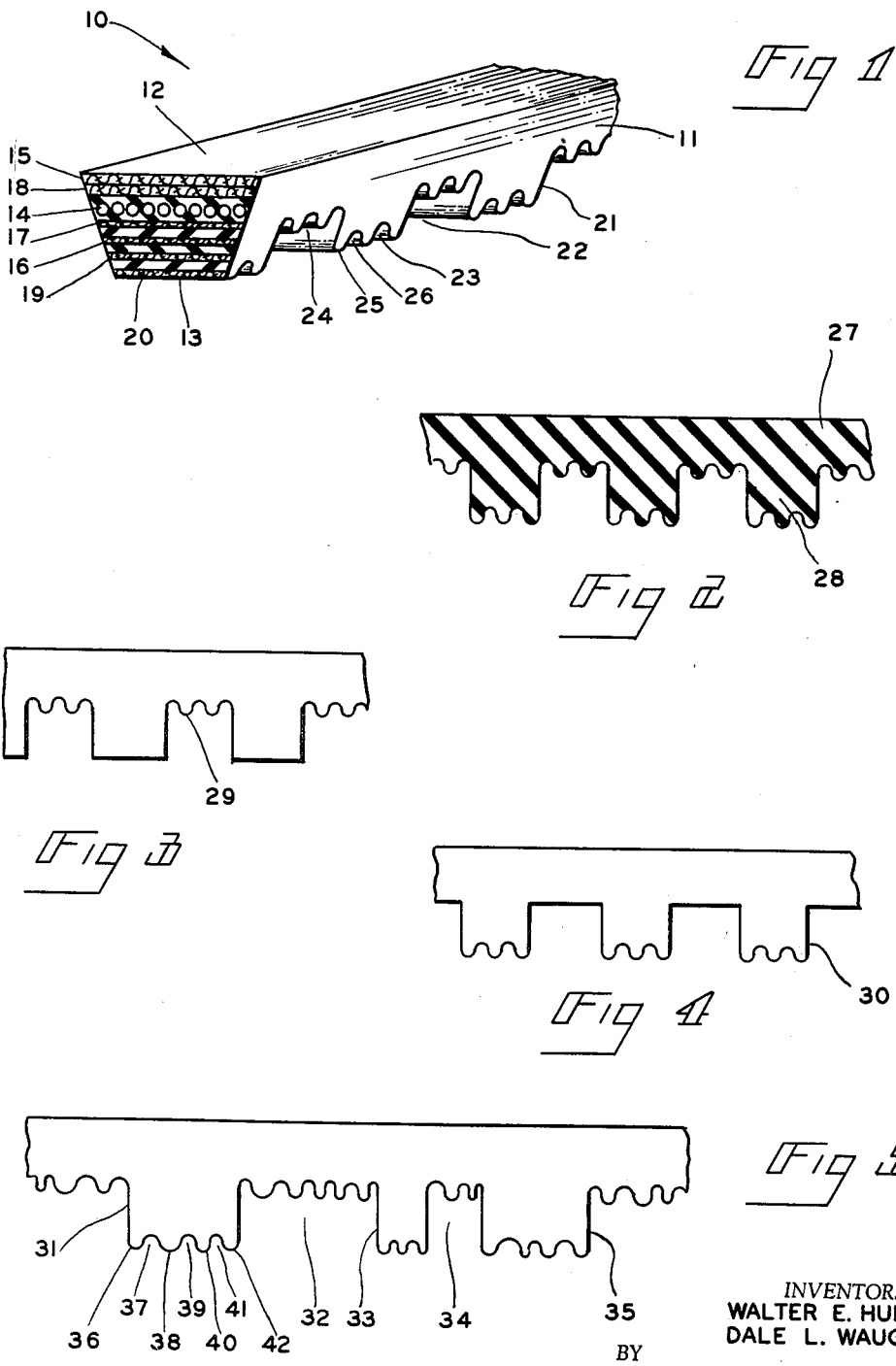
INVENTORS
WALTER E. HUBER
DALE L. WAUGH
BY
Reuben O Wolh
ATTORNEY though such relatively rigid fabric is employed, the cogs to "chord" the arc of the pulley or sheave about which the belt is operating.

United States Patent Office
2,941,413
Patented June 21, 1960

2,941,413
POWER TRANSMISSION BELTS

Walter E. Huber and Dale L. Waugh, Dayton, Ohio, assignors to Dayco Corporation, a corporation of Ohio Filed Jan. 22, 1957, Ser. No. 635,304

18 Claims. (Cl. 74—231)

The present invention relates to power transmission belts and particularly to such belts as are characterized by inwardly disposed cogs in the form of alternating teeth and grooves and are commonly known as cog belts.

In the art of power transmission wherein flexible belts operating about spaced pulleys or sheaves have been employed, it has been a conventional practice, particularly where increased flexibility is desired, to employ cog belts wherein the inwardly projecting cogs or teeth will be forced together toward the grooves or troughs therebetween. Since the grooves will offer no resistance to such movement of the cogs, the belts are capable of flexing with greater ease and with less resultant internal stresses, thus prolonging the belt life. In view of the constant movement of the cogs and the concentrated flexing of the surface of the grooves separating the same, however, the inner belt surface has succumbed to fatigue failures in the form of small tears or cracks which, upon continued operation, open up to destroy the belt utility long before its otherwise available operational life has been exhausted.

This premature failure of the belts at the surface of the grooves has been particularly pronounced in the many instances where it has been desired to employ a relatively rigid material in the innermost portion of the belt to provide greater lateral belt rigidity and to more completely preserve the integration of the teeth with the belt body. In addition to the fact that the relatively rigid material in the innermost portion of the belt is more susceptible to the fatigue type flexing failures the rigidity also acts to prevent the individual cogs from conforming to the configuration of the pulley or sheave about which the belt operates and to "chord" rather than curve around the arc of the effective circumference of the pulley or sheave. Since the cogs in such cases pass about the sheave as individual, relatively planar segments in contact with a substantially arcuate surface, excessive stresses and wear upon the cog have resulted about the edges thereof. This type of wear is particularly severe in the case of belts of trapezoidal cross section commonly known as V-belts in that the corners of the cogs have been excessively urged against the divergent side driving surfaces of the pulleys in which such belts operate. Where one or more layers of rubberized fabric are employed about the inner surface of the belt to provide the lateral ridigity and the improved integration between the corrugations and the belt body, the increase of the wear at the edges and on the corners of the cogs or teeth resulting from their inability to readily conform to the arcuate surface of the pulleys or sheaves results in a premature wearing of the fabric and the loss of its functions. Such problems are even more acute where the fabric is applied to the belt in such a manner that the warp and weft threads thereof extend at right angles to each other and lie longitudinally and transversely of the belt body in that, while such fabric does increase the lateral rigidity of the inner portion of the belt, it simultaneously impairs its flexibility and increases the tendency of the indivdiual teeth or An additional problem encountered in many cog belt drives and particularly objectionable in certain applications thereof is the noise which results from the vibrations set up by the cogs in their travel through or about the sheaves or pulleys in connection with which they are employed.

It is accordingly an object of the present invention to provide an improved cog type power transmission belt.

It is a further object of the present invention to provide a cog belt capable of prolonged period of operation wherein the cogs are composed of or closely associated with a relatively rigid material.

It is a further object of the present invention to provide an improved cog belt wherein, notwithstanding the relatively large dimensions and relative rigidity of the individual teeth, fatigue type failures will not occur at the troughs or grooves separating such teeth.

It is still another object of the present invention to provide a cog belt wherein, notwithstanding the relatively large dimensions and rigidity of the teeth, the same will conform to the arcuate surface of the pulleys or sheaves about which the belt is operating.

It is yet a further object of the present invention to provide a cog belt wherein the cogs will be prevented from creating vibrations which result in objectionable operational noises.

To achieve these and other objects and advantages of the present invention which will be apparent from a reading of the following disclosure, the present invention provides a series of corrugations having projections or ridges separated by depressions or valleys similar to the cogs except that the corrugations are of substantially smaller cross-sectional dimensions. Where the corrugations are provided about the innermost surface of the cogs, it has been discovered that these cogs will be sufficiently flexible to bend in passing about a pulley so that their innermost surface will conform to the arcuate pulley surface rather than pass over the same as substantially planar segments, notwithstanding the fact that they may be composed of rigid material or have a stiffening fabric about their inner surface. On the other hand, where the corrugations are provided about the inwardly disposed surfaces of the grooves separating the cogs, it has been found that the flexibility of this innermost portion of the belt will be so increased that fatigue type failures in the form of tears or cracks in the surface area of such grooves will be prevented.

Moreover, it has been discovered that if the pitch or longitudinal spacing of the cogs and the corrugations as well as the dimensions thereof longitudinally of the belt are varied, the internal stress pattern set up by the repeated flexing of the belt about a pulley or sheave may be varied so as to distribute the wearing effects of such flexing to the ultimate prolongation of belt life. Similarly, it has been found that such variations prevent the establishment or reinforcement of any oscillations or vibrations of the belt which tend to produce objectionable operational noises.

The invention thus generally described may be more clearly understood by a reference to the following detailed description of certain preferred embodiments thereof in connection with which reference may be had to the appended drawings.

In the drawings:

Figure 1 is a perspective view in partial cross section of one form of a cog belt incorporating the features of the present invention.

Figure 2 is a cross-sectional elevational view showing a modified cog belt construction according to the present invention.

Figure 3 is a view in elevation illustrating one form of arrangement of the corrugations in a cog belt according to the present invention.

Figure 4 is an elevational view showing an alternative arrangement of the corrugations in a cog belt according to the present invention.

Figure 5 is an elevational view illustrating still a further modified arrangement of the teeth and corrugations in cog belts according to the present invention.

In Figure 1, a typical belt 10 according to the present invention is shown to comprise a body portion 11 having an upper or outer surface 12 and a lower or inwardly disposed surface 13. The top and bottom surfaces are designated as outer and inner respectively in view of the fact that, as the belt is operating about a series of pulleys, the lower surface will be toward the direction of flexure which is normally inwardly of the series of spaced pulleys, while the upper surface will be outwardly thereof. Since, as the belt flexes, it will tend to do so about a neutral axis extending transversely of the belt above which axis all of the belt material will be subjected to stretching or tension and below which all of such material will be subjected to compression, belts are commonly regarded as being divided into three sections which are the neutral axis section 14, the outwardly disposed tension section 15 and the inwardly disposed compression section 16. The neutral axis section 14 is usually composed of a longitudinally inextensible material of relatively high tensile strength, and such a material may be either longitudinally extending cord or strand like members or a heavy rubber impregnated fabric such as 17 laid so that the stronger of the warp or weft threads extend longitudinally of the belt. The outwardly disposed tension section, since it must be relatively extensible to accommodate the belt flexure, is usually composed of a flexible material such as rubber or a rubber impregnated fabric 18 which is so laid in the belt that the warp and weft threads are at oblique angles to the longitudinal axis thereof. Similarly, the compression section, which will have to be compressed upon flexure of the belt, is composed of a deformable material such as a bias laid rubberized fabric 19.

The belt body composed as described above, may be encased by a rubberized fabric cover surrounding all of the belt surfaces; and in practically all cases, there is at least a fabric layer 20, sometimes known as a base fabric, located about the innermost belt surface. As explained above, this base fabric 20 is often employed in the case of cog belts to provide lateral rigidity to the belt and particularly to the individual cogs thereof and further to provide for more permanently securing the cogs to the body of the belt. This base fabric 20 will of course, also be subjected to compression as the belt flexes about a pulley, and it is preferably of a deformable material such as a bias laid rubberized fabric. Where, however, greater lateral rigidity is desired, it is preferred that the stronger of the warp or weft threads of this fabric should extend transversely of the belt body; and the fabric as to this portion of the belt may be so laid.

Projecting inwardly from the belt body which may be regarded as defined by the plane of the grooves hereinafter described are a plurality of projections in the form of primary teeth or cogs 21 which are spaced longitudinally of the inner surface of the belt and separated by the grooves or troughs 22. It is the face or most inwardly disposed suface 23 of the teeth 21 which tends to chord the arc of the pulley or sheave about which the belt operates and is therefore subjected to the wearing conditions above described when that condition is present. It is upon the base 24 of the groove 22 that the concentrated flexing takes place and the resulting fatigue tears or cracks occur.

To prevent these failures, the faces 23 of the teeth 21 are provided with corrugations having alternating ridges or projections 25 and valleys or depressions 26 similar to the alternating teeth 21 and grooves 22. These corrugations differ from the teeth however, in that they are of considerably smaller cross-sectional dimensions, and further in that they may be of any desired shape such as rectangular, triangular, or arcuate. The teeth 21 and grooves 22 for example, may be from $\frac{1}{16}$ to $\frac{1}{2}$ inch in depth and width, while the depth and width of the projections and grooves may be from one twelfth to one half of the corresponding dimensions of the teeth and grooves. The problems which are solved by the provision of the corrugations according to the present invention are most pronounced in those cog belts wherein the depth and/or width of the grooves and/or teeth exceed $\frac{3}{16}$ of an inch, and it follows that the invention finds its greatest utility and provides the greatest improvement in such belts.

Whereas the belt shown in Figure 1 relies upon the base fabric 20 for the lateral rigidity of the cog portion, the belt shown in cross section in Figure 2 derives such rigidity from the use of an elastomeric material of greater hardness in the teeth. Thus, while the main body 27 of the belt shown in Figure 2 may be composed of a relatively soft or deformable elastomeric material, the cog area consisting of the teeth or cogs 28 is composed of a relatively harder elastomeric material. Where the elastomeric material is a rubber or like vulcanizable material, the relative hardnesses of the material employed in the two sections may be controlled by compounding expedients well known in the art of rubber chemistry. In this case as in the case of cogs made rigid by the presence of the fabric as described in connection with Figure 1, the problem of fatigue failure in the primary grooves and excessive wear resulting from the cogs chording the arc of the sheave; and consequently the present invention provides substantial improvement in such cases.

While the innermost surface of both the teeth and the grooves have been shown to be provided with the corrugations in the belts illustrated in Figures 1 and 2 described above, in certain instances, these corrugations may be provided only along the innermost surface of the grooves such as at 29 in Figure 3 or along the face or innermost surface of the teeth as shown at 30 in Figure 4.

When the corrugations according to this invention are employed, an additional salutory effect of the same is their influence upon the operational vibration of the belt which has in the past often led to objectionable noise. Because the corrugations are of a different pitch and size than the cogs, they tend to establish a vibration of a frequency higher than that resulting from the cogs, and it has been found that these two simultaneous frequencies act against each other to inhibit any reinforcement which might lead to objectionable noise.

In a further refinement of the present invention however, it has been found that this noise retarding influence may be even more definitely asserted by varying the size, pitch and arrangement of the individual projections and grooves. Thus, noise free operation may be even more completely insured in a belt having a pattern similar to that shown in Figure 5 wherein the pitch or longitudinal spacing, and the thickness of the teeth and grooves vary from one tooth and groove to the next. For example, the tooth 31 is wider than the next subsequent tooth 33, which is not as wide as the next tooth 35; and the groove 32 is wider than the next groove 34; and this variation of tooth and groove widths may continue in a progression throughout the entire belt length or in a repeating pattern comprising any number of teeth and grooves.

While the above described variation in the pitch and width of the teeth and grooves will in itself prevent any reinforcement of what might become objectionable noise vibrations, the teachings of this invention may be further applied by similarly varying the pitch and width of the corrugations. In such a construction the projections 36, 38, 40 and 42 will be dissimilar in width and pitch and will be separated by depressions 37, 39 and 41 which are also dissimilar in width and pitch. The same variation in width and pitch of the projections and depressions may continue in a like progression for all of the corrugations located either at the face of the teeth or at the base of the grooves or both, the pattern beginning anew with each tooth and/or groove.

The variably spaced and dimensioned cogs and corrugations in belts according to the present invention may be formed by conventional molding practices heretofore employed in the formation of cog belts. One method for such construction involves winding upon a mandrel a plurality of laminae of belt material such as layers of rubbeized fabric or sheets of elastomeric material to form a sleeve from which individual belt widths may be cut. The belt bodies thus formed may be wrapped with a suitable rubberized fabric cover and the innermost face of the belt subjected to a cutting or notching action to provide the cogs. Where a repeating pattern of variably dimensioned and spaced cogs is desired, a multiple edged cutting member for simultaneously cutting all of the notches in one pattern of such variations may be employed. Once this primary notching has been completed, a base fabric may be applied by stitching or otherwise to the notched inner belt surface prior to the vulcanization of the belt in a suitable press capable of providing heat and pressure. Since the corrugations are of substantially smaller dimensions than the cogs, the former need not be previously cut in the belt but may be formed in the first instance at the time of the final molding and vulcanization by employing a mold having a corrugated surface corresponding to the previously formed cogs and having additional secondary alternating projections and depressions respectively to form the depressions and projections of the corrugations either at the face of the teeth, the base of the grooves, or both.

While the present invention has been described in considerable detail in connection with certain preferred embodiments thereof, the foregoing particularization and detail have been for the purposes of illustration only and in no way limit the scope of the present invention as it is defined in the subjoined claims.

We claim:

1. A flexible power transmission belt having an inner surface comprising transverse teeth defining grooves therebetween, and transverse corrugations along a portion of said inner surface.

2. A flexible power transmission belt comprising a plurality of inwardly disposed teeth defining grooves therebetween and transverse corrugations on the inner faces of said teeth and the inner bases of said grooves, the cross section of said corrugations being substantially smaller than that of said teeth.

3. A flexible power transmission belt comprising a plurality of inwardly disposed teeth defining grooves therebetween and transverse corrugations on the bases of said grooves.

4. A flexible power transmission belt comprising a plurality of inwardly disposed teeth defining grooves therebetween and transverse corrugations on the bases of said grooves, the cross section of said corrugations being substantially smaller than that of said teeth.

5. A flexible power transmission belt comprising a plurality of inwardly disposed teeth defining grooves therebetween and transverse corrugations on the face of said teeth.

6. A flexible power transmission belt comprising a plurality of inwardly disposed teeth defining grooves therebetween and transverse corrugations on the face of said teeth, the cross section of said corrugations being substantially smaller than that of said teeth.

7. A flexible power transmission belt comprising inwardly disposed longitudinally spaced teeth defining grooves therebetween, each of said teeth and said grooves varying in width from each adjacent tooth and groove respectively.

8. A flexible power transmission belt comprising inwardly disposed teeth defining grooves therebetween, the width of each tooth being different from the width of its adjacent ones.

9. A flexible power transmission belt comprising inwardly disposed longitudinally spaced teeth defining grooves therebetween, the width of each groove being different from the width of its adjacent ones.

10. A flexible power transmission belt comprising inwardly disposed teeth defining grooves therebetween and transverse corrugations on the faces of said teeth and the bases of said grooves varying in longitudinal spacing, the cross section of said corrugations being substantially smaller than that of said teeth.

11. A flexible power transmission belt comprising inwardly disposed teeth defining grooves therebetween and transverse corrugations on the faces of said teeth and the bases of said grooves varying in width, the cross section of said corrugations being substantially smaller than that of said teeth.

12. A flexible power transmission belt comprising inwardly disposed teeth defining grooves therebetween and transverse corrugations on the faces of said teeth varying in longitudinal spacing, the cross section of said corrugations being substantially smaller than that of said teeth.

13. A flexible power transmission belt comprising inwardly disposed teeth defining grooves therebetween and transverse corrugations on the bases of said grooves varying in longitudinal spacing, the cross section of said corrugations being substantially smaller than that of said teeth.

14. A flexible power transmission belt comprising inwardly disposed teeth defining grooves therebetween and transverse corrugations on the faces of said teeth varying in width, the cross section of said corrugations being substantially smaller than that of said teeth.

15. A flexible power transmission belt comprising inwardly disposed teeth defining grooves therebetween and transverse corrugations on the bases of said grooves varying in width, the cross section of said corrugations being substantially smaller than that of said teeth.

16. A flexible power transmission belt comprising inwardly disposed teeth defining grooves therebetween and transverse corrugations on the faces of said teeth and the bases of said grooves varying in longitudinal spacing and widths, the cross section of said corrugations being substantially smaller than that of said teeth.

17. A flexible power transmission belt according to claim 16 wherein the depth of said teeth and grooves exceeds $3/16$ of an inch and the depth of said corrugations is from $1/12$ to $1/2$ of the depth of the teeth and grooves.

18. A flexible power transmission belt according to claim 16 wherein the width of said teeth and grooves exceeds $3/16$ of an inch and the width of said corrugations is from $1/12$ to $1/2$ of the width of the teeth and grooves.

References Cited in the file of this patent

UNITED STATES PATENTS

| | | |
|---|---|---|
| 1,701,507 | Roderwald | Feb. 12, 1929 |
| 2,084,784 | Stahl | June 22, 1937 |
| 2,167,384 | Freedlander | July 25, 1939 |
| 2,186,180 | Sloman et al. | Jan. 9, 1940 |
| 2,281,148 | Freedlander | Apr. 28, 1942 |
| 2,625,828 | Nassimbene | Jan. 20, 1953 |